(12) United States Patent
Rickelm et al.

(10) Patent No.: US 6,321,916 B1
(45) Date of Patent: *Nov. 27, 2001

(54) LIQUID CLARIFICATION TANK

(75) Inventors: Henry E. Rickelm, Somonauk; Daniel H. Phillips, Hinckley; Donald N. Ruehrwein, Batavia, all of IL (US)

(73) Assignee: Chicago Bridge & Iron Company, Plainfield, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/587,434

(22) Filed: Jun. 5, 2000

(51) Int. Cl.[7] .................................................. B01D 21/02
(52) U.S. Cl. ........................ 210/519; 210/532.1; 210/540
(58) Field of Search ........................................ 210/513, 519, 210/521, 532.1, 532.2, 534, 535, 540

(56) References Cited

U.S. PATENT DOCUMENTS

| | | | |
|---|---|---|---|
| 1,607,280 | * | 11/1926 | King ............................ 210/532.2 |
| 3,965,013 | * | 6/1976 | Jackson ........................ 210/534 |
| 4,487,692 | * | 12/1984 | Kersten ........................ 210/532.1 |
| 4,976,875 | * | 12/1990 | Ryynänen ..................... 210/534 |
| 4,983,294 | * | 1/1991 | Lamb ........................... 210/521 |
| 4,983,295 | * | 1/1991 | Lamb et al. .................. 210/521 |
| 5,100,545 | * | 3/1992 | Brooks ......................... 210/532.1 |
| 5,804,062 | * | 9/1998 | Wyness ........................ 210/540 |
| 6,092,671 | * | 7/2000 | Ruehrwein et al. ........... 210/519 |
| 6,171,498 | * | 1/2001 | Fassbender et al. .......... 210/540 |

* cited by examiner

*Primary Examiner*—Christopher Upton
(74) *Attorney, Agent, or Firm*—Marshall Gerstein & Borun

(57) ABSTRACT

An upflow liquid clarifier for treating a liquid that contains dissolved or suspended solids has a lower chamber with two curved ends connected by a straight section, a centrally-disposed dividing wall extending upwardly from that lower chamber, and an outer wall that extends upwardly and outwardly from the lower chamber. Inlets in communication with the lower chamber provide entry for liquid, which rises in a helical motion through the clarifier. Motion of the water establishes a sludge blanket, through which clarified water rises and can be removed from near the top of the clarifier. A sludge removal structure allows the continuous or periodic removal of sludge.

9 Claims, 5 Drawing Sheets

LIQUID CLARIFICATION TANK

This invention relates generally to apparatus for treating liquids to remove dissolved or suspended solids, such as for treating water to clarify it for potable or industrial use, or for treating wastewater, and more particularly to clarifiers in which the liquid flows in an upward helical path, gradually decreasing in velocity until precipitated or suspended solids separate from the rising water to create a rotating sludge blanket beneath a region of clarified water.

BACKGROUND OF THE INVENTION

An upflow water clarifier, such as those disclosed in Wyness U.S. Pat. Nos. 4,146,471 and 4,765,891, is a type of clarifier that has a prominent conical portion extending upwardly and outwardly from a central lower cylindrical end. Contaminated water enters the clarifier near the lower end. Inside, the water is given a rotational movement, often in part by feeding it into the clarifier in a tangential direction, resulting in a generally upward helical flow of the water within the clarifier.

The increasing diameter of the clarifier toward its upper end causes a decrease in velocity of the liquid as it moves upwardly. As the velocity decreases, suspended solids having a higher density than water agglomerate and separate from the water, forming a revolving sludge blanket that remains behind as clarified water continues moving upwardly until being withdrawn as clarified effluent.

Conventionally, the effluent is removed from the clarifier over weirs or troughs, while sludge is periodically removed through a sludge concentrator, which is typically located on the central axis of the clarifier, but which can alternatively be provided off of the central axis or even outside of the vessel, immediately adjacent the vessel wall.

One problem with upflow clarifiers is a limitation in the maximum practical size. In order to handle large flow rates, upflow clarifiers can become undesirably tall, leading to difficulties in maintaining structural stability and in fitting into an existing hydraulic profile. If the top of the clarifier is to be at ground level, more difficult and expensive excavation is needed; if the base of the clarifier is to be at ground level, more energy is needed to pump the liquid through the clarifier. Aesthetic concerns may also be a significant problem.

Use of multiple smaller vessels is often not a good solution. Multiple smaller vessels may be more expensive and may require more land than is readily available, and can also create piping and valving problems.

SUMMARY OF THE INVENTION

The applicants have developed a new shape for an upflow clarifier that allows for the clarifier to handle a proportionally greater flowrate of liquid without becoming excessively tall. This results in a clarifier that can fit into a tighter hydraulic profile, allowing greater stability and requiring less pumping energy and less excavation. The more efficient size can also reduce the number of vessels required on a site, reducing the expense and the overall land requirements as well as piping and valving requirements.

Instead of a conventional circular lower chamber for receiving the liquid to be clarified, the claimed design includes a lower chamber that has an extended shape with two curved ends connected by a straight section. The clarifier includes a conventional outer wall extending upwardly and outwardly from the lower chamber, one or more conventional inlets in liquid communication with the lower chamber, a conventional means for withdrawing clarified liquid from near the top of the clarifier, and a conventional sludge removal structure.

A centrally-disposed dividing wall in the lower chamber may aid in the establishment of rotational movement in the liquid as it enters the lower chamber.

Improved construction efficiencies may also be possible. For example, a modular approach can be used to construct clarifiers of various different sizes. Conceptually, a typical clarifier can be cut in half by vertical plane, resulting in a pair of curved sections, and then those halves can be spread apart horizontally and connected by adding a straight section between the curved sections. This allows the capacity of the clarifier to be changed by simply lengthening or shortening the length of the relatively easy-to-fabricate straight section. By enabling the capacity of the clarifier to be changed without requiring any changes in the more complicated curved sections of the clarifier, significant cost savings may be realized.

Further advantages should be apparent to those skilled in the art upon reviewing the following detailed description and accompanying drawings, in which:

DETAILED DESCRIPTION OF THE DRAWINGS

Figure 1:
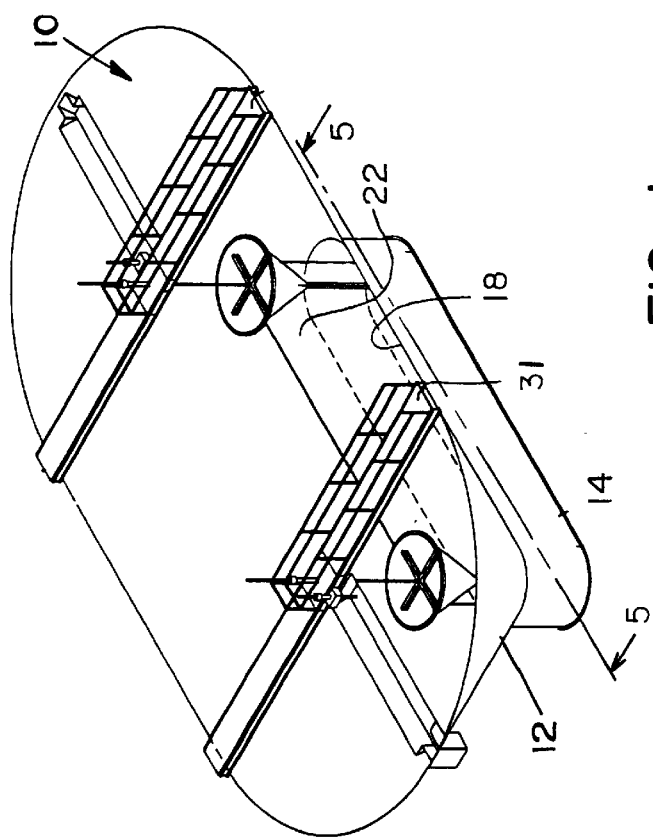
FIG. 1 is a perspective view of the shell of a water clarifier in accordance with the present invention.

FIG. 1 shows one embodiment of a shell 10 for an upflow clarifier in which a liquid, in this case water, is clarified. The illustrated shell may be used for clarifying water for industrial use, for clarifying drinking water, or for clarifying wastewater. The shell has an outer wall 12 in the form of a frustum of a cone that extends upwardly and outwardly from a lower chamber 14, which forms the base of the shell. The outer wall 12 defines a main chamber 18 of the clarifier.

Figure 2:
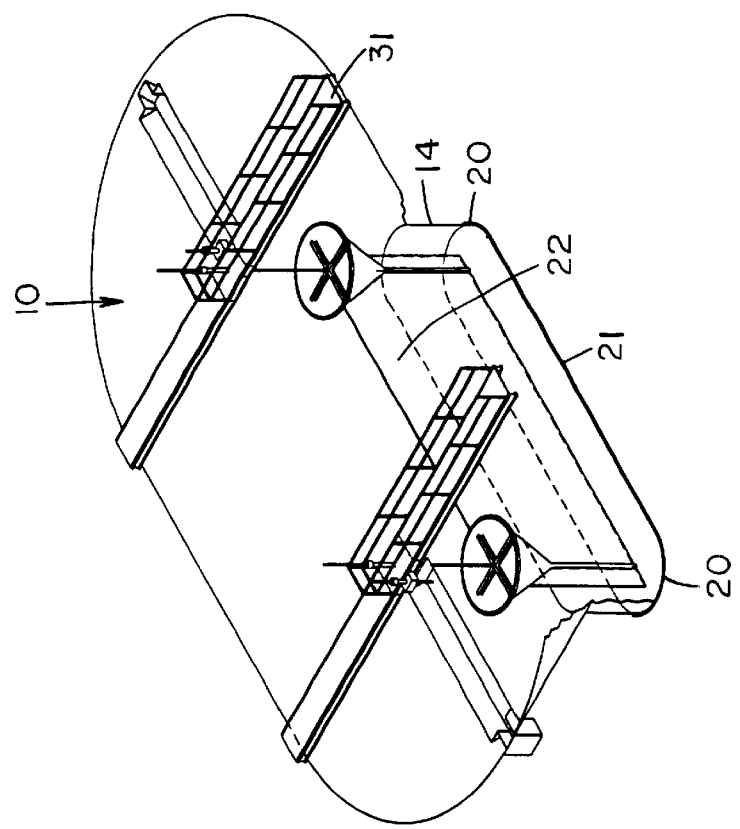
FIG. 2 is a broken-away view of the shell of FIG. 1.

As best seen in FIG. 2, the lower chamber 14 is extended with two curved ends 20 connected by a straight section 21. As illustrated, the lower chamber includes a straight, centrally-disposed dividing wall 22 that extends upwardly above the lower chamber. Preferably, the lower chamber takes the form of an elongated, cylindrical racetrack, but other geometries, including one in which the outer wall is a conical section that is continuous with the outer wall 12 and may be truncated, may also be useful.

As illustrated, one or more access and observation decks 31 can be used to span a portion of the main chamber 18 of the shell 10 to enable an operator to make a visual inspection of the water being clarified and to operate equipment. At least a part of the weight of such a deck can be supported by the dividing wall 22, which, as illustrated, extends through the interior region of the lower chamber 14 and through the main chamber 18 of the clarifier. The dividing wall may be provided with stiffening members, not shown, for this purpose.

As illustrated, the shell 10 has no upper rim. Alternatively, the shell could have a short cylindrical upper rim or could take other forms, such as a long cylindrical section or an inwardly-projecting cone or frustum.

Inlets 40 (seen in FIGS. 3 and 4) allow untreated liquid to be fed to the lower chamber 14 of a clarifier 11. When in use, clarified effluent is withdrawn from the clarifier through an outlet 50 (FIG. 5) in the main chamber 18. As is conventionally known, positioning the inlets tangentially to the lower chamber and removing liquid from the top of the main chamber develops an upward helical flow in the liquid in the clarifier. Vanes (not shown) could also be used to develop or maintain a helical flow, and it is not necessary to provide multiple inlets as shown here.

One or more chemical inlets for introducing water treatment chemicals, such as precipitating, coagulating, and/or flocculating agents, can also be provided in either the lower chamber 14 or the main chamber 18.

As water (or other liquid) in the clarifier 11 rises in a helical path through the lower chamber 14 and subsequently through the main chamber 18, it spreads to fill the increasing cross-sectional area of the main chamber. This spreading results in a corresponding decrease in the velocity of the water, while the net flow rate remains constant. The velocity of the water continues to decrease as it moves upwardly and a point is reached where the lifting force of the water and the counteracting gravitational force on solids suspended in the water are in equilibrium. At that point, the lifting force of the water is not great enough to lift the suspended solids any higher in the clarifier, and the solids tend to accumulate in what becomes a suspended sludge blanket rotating in a portion of the main chamber.

As solids accumulate in a sludge blanket, water continues to flow upwardly through the blanket. This continuing upward movement results in a layer or clarified water in the main chamber 18 of the clarifier 11 above the sludge blanket.

Figure 3:
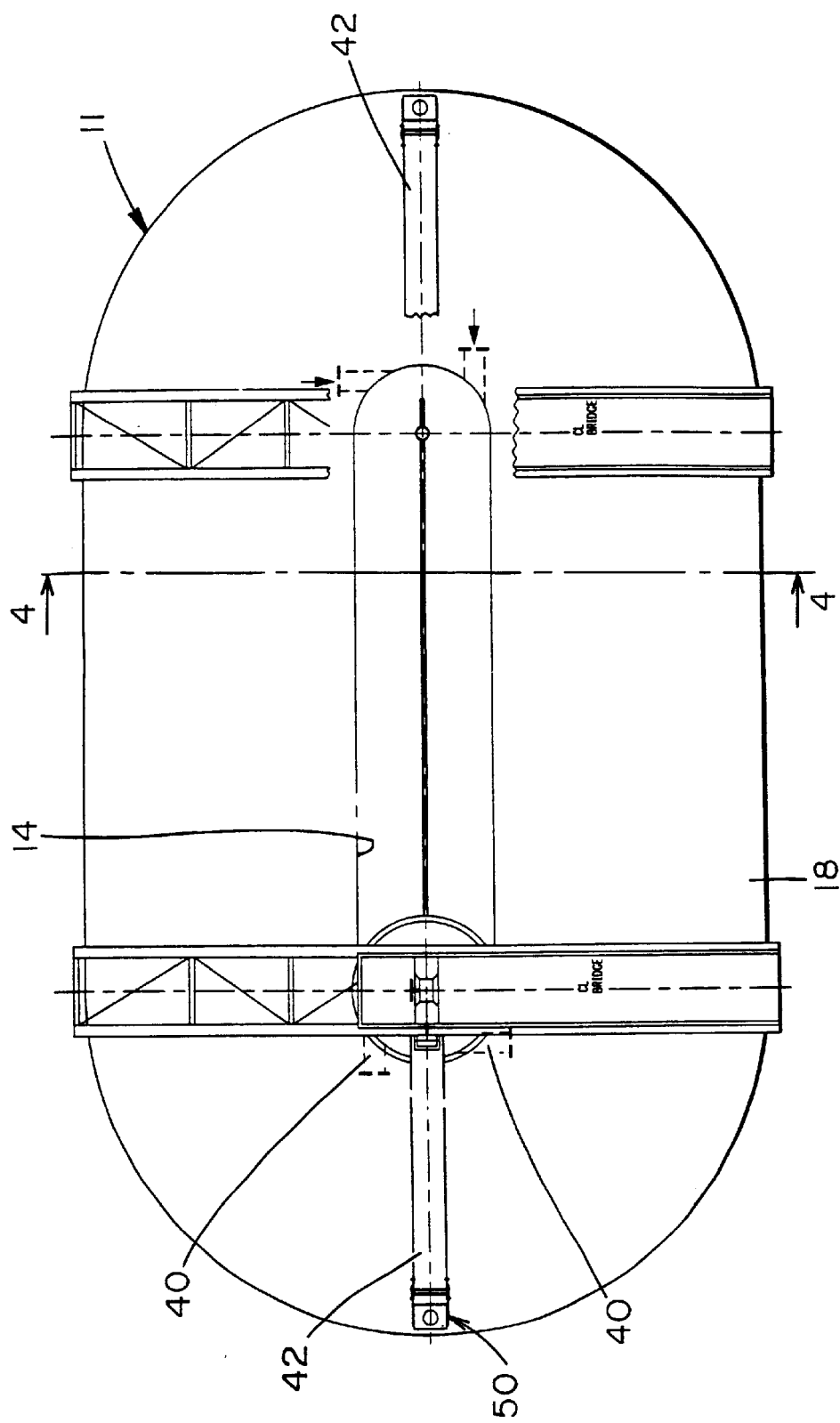
FIG. 3 is a top view of a clarifier employing the shell of FIG. 1.
Figure 4:
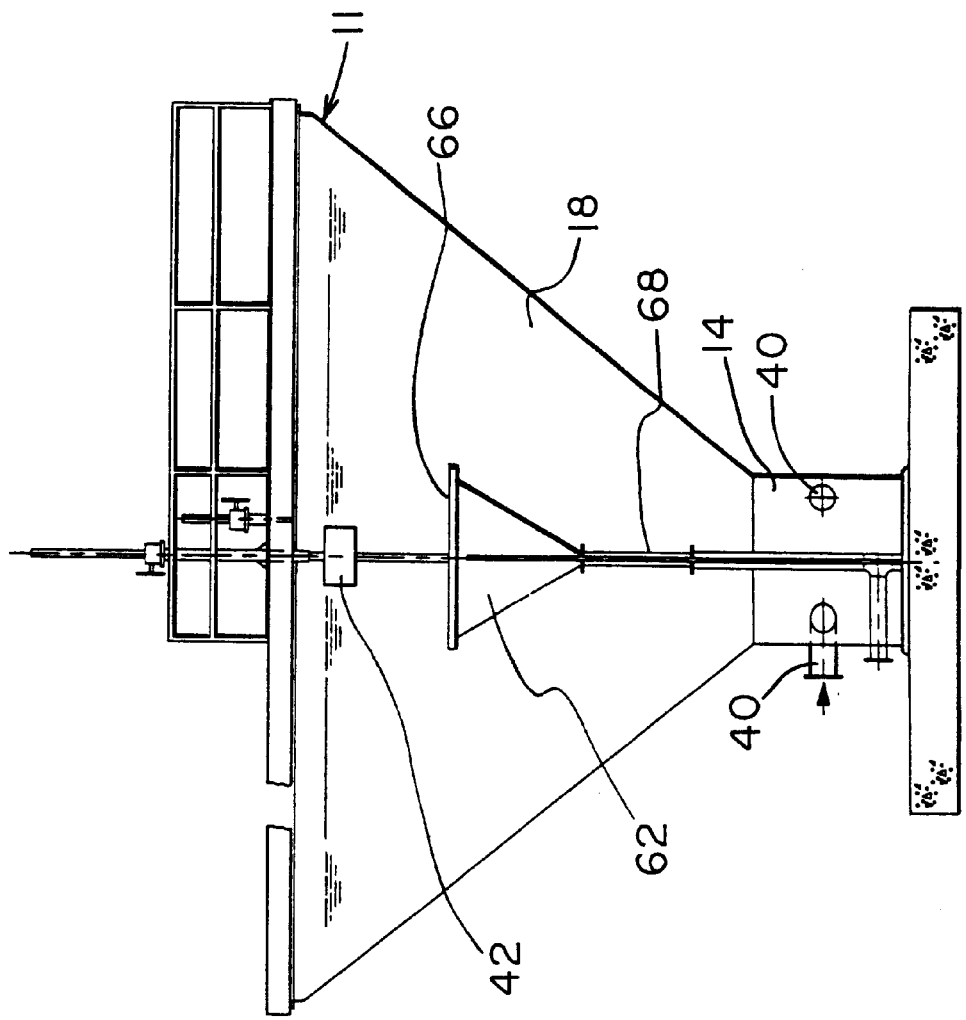
FIG. 4 is a cross-sectional side view of the clarifier of FIG. 3, taken along line 4—4 of FIG. 3.
Figure 5:
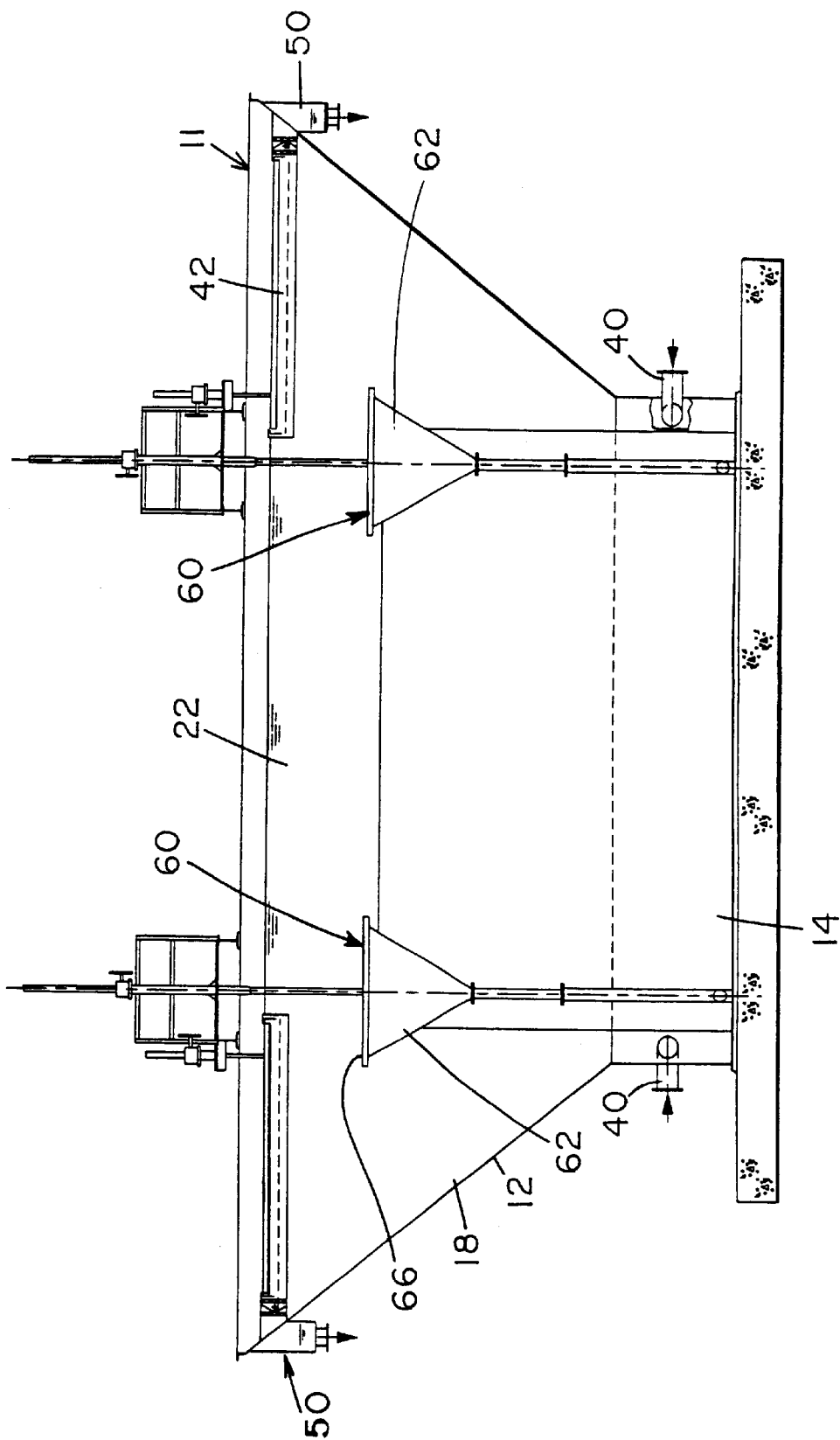
FIG. 5 is a cross-sectional side view of the clarifier of FIG. 1, taken along line 5—5 of FIG. 1.

The clarifier 11 illustrated in FIGS. 3–5 is about 34 feet tall and the curved ends have a diameter of about 60 feet. The overall length, along the elongated axis, is about 120 feet. The lower chamber 14 is about 10 feet tall, about 72 feet long and about 12 feet across. These sizes could be modified.

In order to assure that the vessel is economical, it is generally preferable that the outer wall 12 of the main chamber 18 be angled no less than about 30 degrees with respect to the vertical. In order to assure that sludge blanket particles do not settle and accumulate on the outer wall 12, it is also generally preferable that the angle of each wall be at least about 40 degrees with respect to the horizontal. Preferably, the cross-sectional area of the main chamber near the outlet 50 is about ten to forty times the cross-sectional area of the bottom of the main chamber.

The outlet 50 for withdrawing effluent from the clarifier 11 can be arranged in many ways. For example, conventional radial weirs, peripheral weirs, or circular collection troughs can be used. As illustrated in FIGS. 3–5, the outlet 50 includes radial weir troughs 42. Such troughs could be at least partially supported by the central dividing wall 22. Partially supporting such troughs from a central dividing wall reduces the support requirements of the observation deck from which such troughs are otherwise commonly suspended.

In upflow clarifiers, it is periodically necessary to remove sludge from the sludge blanket. Conventional upflow clarifiers typically utilize conical sludge concentrators to provide a volume in which sludge is concentrated or thickened before being discharged. The use of a larger sludge storage volume allows the use of smaller and less expensive thickeners, lagoons, and/or dewatering equipment to handle the waste sludge removed from the clarifier. In the present invention, sludge can be withdrawn through a sludge removal structure 60 on or near the dividing wall 22. The sludge removal structure can take many different forms.

As illustrated in FIG. 4, the sludge removal structure 60 takes the form of a pair of hoppers 62 on the dividing wall 22. Sludge that rises above an upper edge 66 of the hoppers slips into the hopper, where it can be thickened before being discharged through a sludge discharge line 68. The hoppers can be moved vertically by jacks or the like, so that the upper edge 66 can be selectively positioned at different depths in the main chamber 18 of the clarifier 11. In this way, the height of the top of a sludge blanket in the clarifier can be adjusted by raising or lowering the height of the upper edge of the hoppers. If desired, flanges or plates on the hoppers, not shown, can be used to fill any resulting gap between the hoppers and the dividing wall 22.

Figure 6:
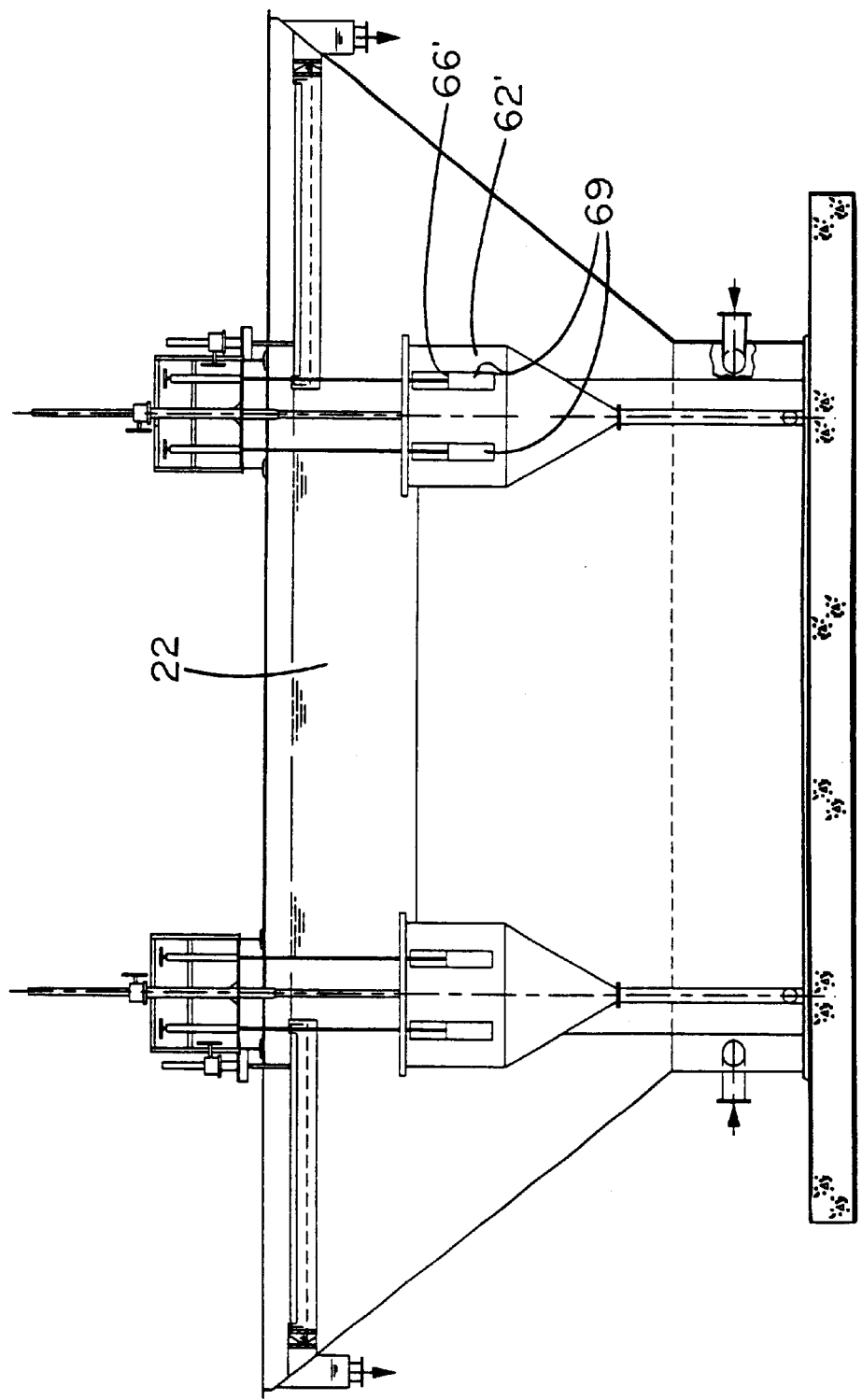
FIG. 6 is a cross-sectional side view of an alternative embodiment of a clarifier in accordance with the present invention.

An alternative type of sludge removal structure 60 is illustrated in FIG. 6. In this embodiment of the invention, the adjustable hoppers 62 of FIGS. 3–5 has been replaced by a non-adjustable hopper 62'. A pair of adjustable gates 69 are provided on each side of the hopper. The gates have upper edges 66' that are used to control the height of the sludge blanket.

The clarifier shown in FIGS. 3–5 has two separate sludge removal structures 60, one positioned at each end of the straight section. The clarifier could be provided with only a single sludge removal structure. Alternatively, the two separate sludge removal structures could be extended and connected to provide one large, elongated sludge collection structure. Other configurations are also possible.

The modular approach incorporated into this design allows flexibility in the design of clarifiers with different capacities with minimal design changes. For example, the clarifier illustrated in FIGS. 3–5 uses the same shell components as a smaller, circular clarifier. In the clarifier illustrated in FIGS. 3–5, the shell has been cut in half and the resulting two semi-circular curved sections have been separated by a straight section that is 50 feet long. The treatment capacity of this new, larger clarifier (about 7500 gpm) may be significantly greater, and the additional capacity is achieved without the need to plan or order materials for curved sections of a different size than those used for the smaller-capacity clarifier.

Alternatively, a shell could be cut into three or more pieces that are joined by straight sections (or even curved sections), resulting in a triangular, square, pentagonal, etc. shape with rounded corners, or an oval. In some cases, the straight sections need not have the same length, resulting in, for example, a rectangular shape with rounded corners.

This detailed description has been given only for cleaners of understanding. As many modifications will be obvious to those skilled in the art, no unnecessary limitations should be understood from this description. Instead, to determine the scope of the invention, reference should be made to the following claims.

What is claimed is:

1. A clarifier for treating a liquid containing dissolved or suspended solids, the clarifier comprising:

a lower chamber with two curved ends connected by a straight section having a centrally-disposed dividing wall;

an outer wall extending upwardly and outwardly from the lower chamber;

a sludge removal structure;

a liquid inlet on the lower chamber; and means for withdrawing clarified liquid from near the top of the clarifier.

2. The clarifier of claim 1, in which the lower chamber is cylindrical.

3. A clarifier for treating a liquid containing dissolved or suspended solids, the clarifier comprising:

a lower chamber with two curved ends connected by a straight section having a solid, centrally-disposed dividing wall;

an outer wall extending upwardly and outwardly from the lower chamber;

a sludge removal structure;

at least one inlet in liquid communication with the lower chamber; and means for withdrawing clarified liquid from near the top of the clarifier.

4. The clarifier in claim 1, in which the straight section includes a straight, centrally-disposed dividing wall that extends vertically above the lower chamber.

5. The clarifier of claim 1, in which the straight section includes a centrally-disposed dividing wall that extends upwardly above the lower chamber.

6. The clarifier of claim 1, in which the straight section includes a straight, centrally-disposed dividing wall that extends upwardly above the lower chamber.

7. A clarifier for treating a liquid containing dissolved or suspended solids, the clarifier comprising:

a lower chamber with two curved ends connected by a straight section having a centrally-disposed dividing wall;

an outer wall extending upwardly and outwardly from the lower chamber;

a sludge removal structure having an edge that can be raised or lowered for controlling a sludge level in the clarifier;

at least one inlet in liquid communication with the lower chamber; and means for withdrawing clarified liquid from near the top of the clarifier.

8. The clarifier of claim 1, in which a sludge discharge line extends along the dividing wall.

9. The clarifier of claim 1, in which the sludge removal structure is supported by the dividing wall.

\* \* \* \* \*